Aug. 3, 1954
G. W. PRICE
2,685,665
THERMOCOUPLE VACUUM GAUGE
Filed Jan. 4, 1951
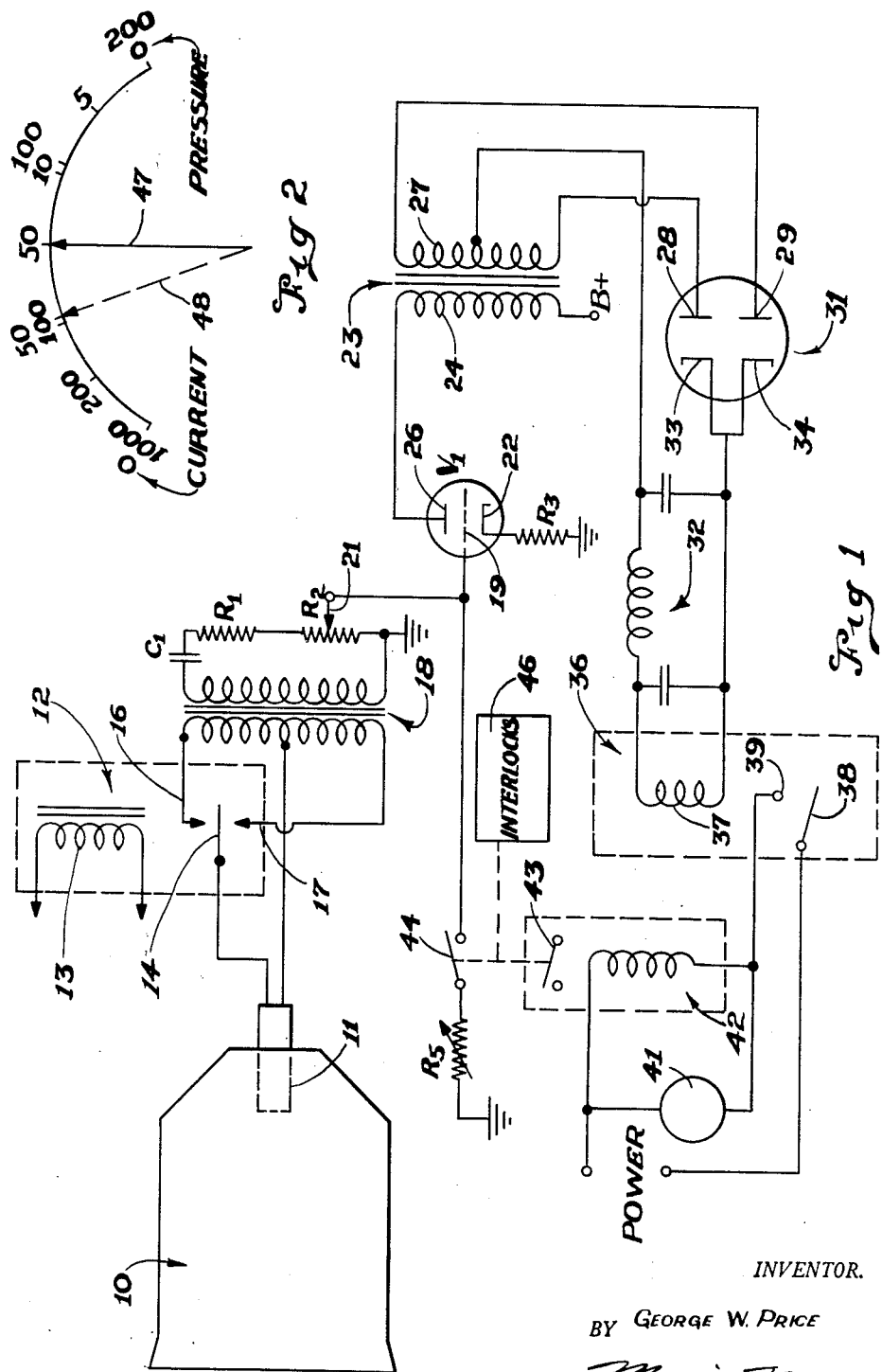
INVENTOR.
BY GEORGE W. PRICE
Marvin Moody
ATTORNEY Patented Aug. 3, 1954

2,685,665

UNITED STATES PATENT OFFICE 2,685,665

THERMOCOUPLE VACUUM GAUGE

George W. Price, Cedar Rapids, Iowa, assignor, by mesne assignments, to the United States of America as represented by the United States Atomic Energy Commission Application January 4, 1951, Serial No. 204,362

1 Claim. (Cl. 317—149)

1

This invention relates to a protector device which may be used, for example, for interlocking various elements in a cyclotron.

In the study of the structure of matter, the cyclotron has been used more and more to accelerate particles and induce radioactivity. In order to operate a cyclotron a very low pressure must be maintained in the accelerating chamber. For example, the pressure during satisfactory operation of a cyclotron should be of the order of $10^{-5}$ millimeters of mercury, which is equal to approximately $10^{-8}$ times atmospheric pressure.

In order to obtain such a low pressure the cyclotron chamber is first partially pumped down with a mechanical pump, generally of the eccentric type, until the pressure reaches a value of approximately 50 microns of mercury (1,000 microns equal one millimeter). At this point the diffusion pumps may be turned on and operated until the pressure is brought down to the $10^{-2}$ micron range. The diffusion pumps should not be turned on until the pressure has been reduced to 50 microns because the presence of excessive oxygen in the chamber will cause the oil of the diffusion pumps to oxidize and burn. Thus, it is necessary to have a sensitive pressure-responsive element which will indicate when the diffusion pumps may be turned on and which will also provide protection for the diffusion pumps in the event that the pressure increases above a certain value.

It is an object of this invention, therefore, to provide a sensitive pressure-responsive means which allows the diffusion pumps to be turned on after a predetermined low pressure is reached and which will automatically disconnect the diffusion pumps when the pressure exceeds a predetermined value.

Another object of this invention is to provide a control apparatus that will actuate a controlled apparatus at a predetermined temperature and which will disconnect it at a second predetermined temperature.

Still another object of this invention is to provide a safety device for protecting the various operating elements of a cyclotron.

A feature of this invention is found in the provision for a thermocouple pressure-responsive gauge which furnishes a control current to a current sensitive relay for actuating it at a predetermined current and for de-actuating it at a second pre-set current. Means for adjusting the actuating and deactuating valves are provided.

Further objects, features, and advantages of this invention will become apparent from the following description and claims when read in view of the drawings, in which:

Figure 1 is a schematic illustration of the protector apparatus of this invention; and, Figure 2 illustrates a dial for the operating range of the apparatus of this invention.

Referring to Figure 1, a cyclotron chamber, designated generally as 10, is to be evacuated to a pressure low enough to allow its operation. A vacuum thermocouple probe 11, which might be of the copper constantan type, extends into the cyclotron chamber. A National Research Corporation type 501 vacuum thermocouple might be used. It produces a direct current output which is inversely proportional to the pressure within the cyclotron chamber. The theory of operation of the vacuum thermocouple is that the more molecules that surround the hot junction of the thermocouple, the cooler it will be due to removal of heat from the junction by the impinging molecules. As the pressure decreases and the number of molecules within the chamber decreases this cooling effect will be decreased and the temperature of the hot junction of the thermocouple will be increased. This results in a current output from the vacuum thermocouple which increases as the pressure decreases.

The direct current output of the vacuum thermocouple 11 is changed to an alternating current so that it can be amplified. A vibrator, designated generally as 12, is excited by a 60 cycle alternating current source which is supplied to the coil 13. A reed 14 vibrates between contacts 16 and 17 in response to the magnetic field of the coil 13. The reed 14 is connected to the one side of the thermocouple 11 and the other side is connected to the midpoint of the primary of a transformer 18. The contacts 16 and 17 are connected to opposite ends of the primary of transformer 18.

The secondary of the transformer 18 has an alternating voltage induced therein and is connected in series with a capacitor $C_1$, resistor $R_1$, and resistor $R_2$. One end of the secondary is grounded.

An amplifier tube $V_1$ has its grid 19 connected to a slide contact 21. The contact 21 engages the resistor $R_2$. The cathode 22 of tube $V_1$ is connected in series with resistor $R_3$ to ground.

The alternating current voltage obtained by contact 21 is proportional to the direct current voltage from the thermocouple 11 and the tube $V_1$ amplifies it. It is desirable to control a current sensitive relay with the output of $V_1$ and, therefore, its output is changed back to direct current. A transformer 23 has its primary 24 connected to the plate 26 of tube V₁ and its opposite side is connected to B+.

The secondary 27 of the transformer has its ends connected to plates 28 and 29 of a double diode rectifier 31. The midpoint of secondary 27 is connected to one side of a low pass filter 32. The cathodes 33 and 34 of the rectifier 31 are connected to the other side of filter 32.

A current sensitive relay 36 has its coil 37 connected across the filter 32. The movable armature 38 of the relay 36 is movable to engage contact 39 when the relay is energized.

The current sensitive relay 36 controls a power relay 42 which is energized by auxiliary power, as for example, 60 cycle alternating current. The armature 38 completes the circuit to relay 42 to energize it. An indicator 41, as for example, a red light is connected in parallel with the relay 42 to indicate when it is energized.

The armature 43 of relay 42 is mechanically linked to a switch 44 and to interlocks 46. The switch 44 is connected in series with a variable resistor R₅ to ground and to the grid 19 of tube V₁. Thus, when the relay 42 is energized, the interlocks 46 are actuated and the resistance R₅ is connected between ground and grid 19.

The relay 36 is a current sensitive relay which might close, for example, at 1.5 milliamperes and open at 1 milliampere. Thus, after the relay has closed, a much smaller current is required to open it. Since the relay 36 is a current sensitive device it develops very little power and therefore, the power relay 42 is used.

The energization of relay 42 closes the switch 44 which decreases the input to tube V₁. The decrease in input causes the current through the relay 36 to be decreased. Therefore, R₂ may be adjusted so that the relay 36 will be energized at any desired output of the vacuum thermocouple 11, and R₅ may be adjusted so that relay 36 will be de-energized at any desired output of the thermocouple. R₅ must however be adjusted to give more than 2/3 of the closing current. For example, if the resistors R₂ and R₅ are adjusted so that when the relays 36 and 42 are energized the output of tube V₁ is less than 2/3 of the output prior to energization, then the relays will immediately be de-energized and oscillation will occur. Adjustment of the contact 21 determines the point at which energization of relays 36 and 42 occur and adjustment of resistor R₅ determines the point at which de-energization occurs.

Suppose that the vacuum gauge of this invention is to be used in a cyclotron and that it is desired to turn the diffusion pumps on at a pressure of 50 microns of mercury. It is also desired to turn them off if the pressure exceeds 60 microns. The contact 21 will be adjusted so that when a pressure of 50 microns exists in the chamber 10 of the cyclotron the relays 36 and 42 will be energized. The resistor R₅ will then be adjusted until the relays 36 and 42 release at a pressure of 60 microns. If the diffusion pump is interlocked with the relay 42 so that it will not operate unless the relay 42 is energized, then it will be impossible for the diffusion pump to operate until a pressure of 50 microns is reached within the chamber 10. Likewise, if, for any reason, such as leakage, fracture of the chamber wall, etc., the pressure within the acceleration chamber 10 exceeds 60 microns, the diffusion pump will be turned off because the relay 42 will be de-energized. It is to be understood, of course, that the diffusion pump is used merely for illustrative purposes and in the actual operation of a cyclotron other apparatus such as the ion gauge (a device used for measuring very low pressures), the beam generating apparatus, and high vacuum valves, must all be protected and maintained inoperative until a sufficiently low pressure is reached within the cyclotron chamber. If, for any reason, the pressure exceeds the minimum values for these apparatuses, the present invention will turn them off and protect them. The various controlled apparatuses are connected to interlocks 46 which may control suitable switches for disabling and connecting them.

Figure 2 illustrates a meter which is calibrated first in pressure from 1,000 to 0 microns and secondly, in output current of the thermocouple from 0 to 200 microamperes. It is to be noted that the current is inversely proportional to the pressure and as the current increases the pressure decreases. The solid needle 47 is set at 50 microns of mercury and the needle 48 is set at approximately 100 microns. This would be the desired condition if it was desired to close the relays 36 and 42 at 50 microns of mercury and to open them at 100 microns of mercury. It is to be noted that the current corresponding to 50 microns of mercury is 75 microamperes, whereas the current corresponding to 100 microns is approximately 50 microamperes. Thus, even though the pressure changes by 100%, the current changes by only 50%. When the needle 47 is moved to 5 microns and the needle 48 is moved to 10 microns, it is seen that the current will change from approximately 150 to 100 microamperes. As long as the de-actuating current remains more than 2/3 of the value of the actuating current, the control apparatus of this invention is operatable.

It is seen that this invention provides a control mechanism for a temperature responsive circuit and allows pre-setting of the actuating and de-actuating point.

Although this invention has been described with respect to particular embodiments thereof, it is not to be so limited as changes and modifications may be made therein which are within the full intended scope of the invention as defined by the appended claim.

I claim:

A control circuit comprising sensing means for producing a variable direct voltage in response to changes in value of a physical condition, means for applying said variable voltage to the input terminals of a converter circuit, said converter circuit including a vibratory interrupter and a pair of output terminals, a voltage divider including a serially connected impedance and a first resistor connected between said output terminals, a slide contact adjustably connected to said first resistor, an electron tube having grid, plate and cathode electrodes, a first circuit including said slide contact and a portion of said first resistor between said grid electrode and said cathode electrode for applying an input signal proportional to said variable voltage to said electron tube, a second circuit connected between said plate and said cathode electrodes electrically connected to rectifying means and an energizing coil of a control relay, said second circuit adapted to conduct a first value of current when said physical condition reaches a predetermined value, said control relay being provided with fixed and movable contacts adapted to close when the current in said coil increases to said first value and to open when the said current decreases below a second value, a compensating resistor connected in parallel with said portion of said first resistor through a normally open circuit interrupter, a power relay, means for energizing said power relay when said contacts are closed, said power relay having actuating means connected to said interrupter for closing said interrupter when said power relay is energized, whereby connection of said compensating resistor in parallel with said portion of said first resistor reduces said input signal and said current in said coil to said second value.

References Cited in the file of this patent

UNITED STATES PATENTS

| Number | Name | Date |
|---|---|---|
| 2,154,064 | Davis | Apr. 11, 1939 |
| 2,332,432 | Busenkell | Oct. 19, 1943 |
| 2,367,746 | Williams | Jan. 23, 1945 |
| 2,425,734 | Gille | Aug. 19, 1947 |
| 2,431,281 | Smith | Nov. 18, 1947 |
| 2,443,122 | Smith | June 8, 1948 |
| 2,579,716 | Wilson | Dec. 25, 1951 |
| 2,584,714 | Kirkpatrick | Feb. 5, 1952 |
| 2,629,826 | McIlvaine et al. | Feb. 24, 1953 |